United States Patent
Guillemaud

(10) Patent No.: US 7,385,637 B2
(45) Date of Patent: Jun. 10, 2008

(54) METHOD FOR DETERMINING IMAGE SENSOR REFERENCE IMAGE

(75) Inventor: Regis Guillemaud, La Tronche (FR)

(73) Assignee: Commissariat A L'Energie Atomique, Paris (FR)

( * ) Notice: Subject to any disclaimer, the term of this patent is extended or adjusted under 35 U.S.C. 154(b) by 773 days.

(21) Appl. No.: 10/415,945

(22) PCT Filed: Sep. 11, 2002

(86) PCT No.: PCT/FR02/03092

§ 371 (c)(1),
(2), (4) Date: May 7, 2003

(87) PCT Pub. No.: WO03/023715

PCT Pub. Date: Mar. 20, 2003

(65) Prior Publication Data
US 2004/0032510 A1  Feb. 19, 2004

(30) Foreign Application Priority Data
Sep. 13, 2001 (FR) .................... 01 11834

(51) Int. Cl.
*H04N 9/64* (2006.01)
*H04N 5/202* (2006.01)
*G06K 9/38* (2006.01)

(52) U.S. Cl. .............. 348/243; 348/251; 348/254; 382/272

(58) Field of Classification Search .......... 348/243, 348/246, 251, 254; 382/272
See application file for complete search history.

(56) References Cited

U.S. PATENT DOCUMENTS

| 4,807,045 | A | | 2/1989 | Shimano |
| 5,881,182 | A | * | 3/1999 | Fiete et al. ................. 382/275 |
| 5,943,141 | A | | 8/1999 | Tamura |
| 6,296,387 | B1 | * | 10/2001 | Guillemaud ................ 378/207 |
| 6,404,853 | B1 | * | 6/2002 | Odogba et al. ............ 378/98.8 |

FOREIGN PATENT DOCUMENTS

DE  43 31 965  3/1995

* cited by examiner

*Primary Examiner*—Lin Ye
*Assistant Examiner*—Kelly Jerabek
(74) *Attorney, Agent, or Firm*—Oblon, Spivak, McClelland, Maier & Neustadt, P.C.

(57) ABSTRACT

The present invention relates to a method for determining the reference image of an image sensor comprising a matrix of detector pixels. The method comprises the acquisition of a black image $I_N$ and two images $I_1$ and $I_2$ acquired in linear detection zones of the sensor. The reference image is written: $I_{R1}=(R_m * I_1-I_2)/(R_m-1)$ with $$I_{R1} = (R_m \times I_1 - I_2)/(R_m - 1)$$

with $Rm = \dfrac{1}{N}\sum_{i,j} \dfrac{I_2(i,j) - I_N(i,j)}{I_1(i,j) - I_N(i,j)},$ wherein $I_K(i,j)$ represents the value of the pixel of the image $I_K$ detected by the pixel detector situated at the intersection of the row i and the column j of the detector pixel matrix, and N represents the total number of pixels in the matrix.

8 Claims, 3 Drawing Sheets

METHOD FOR DETERMINING IMAGE SENSOR REFERENCE IMAGE

TECHNICAL FIELD AND PRIOR ART

This invention relates to a method for determining the reference image of an image sensor.

This invention also relates to a method for correcting image defects that implements a method for determining the reference image according to the invention.

The invention applies to any field using digital images produced on the basis of x or γ radiation and, more particularly, in the field of medical imaging, where the images are formed using detectors utilizing a CCD (charge coupled device) camera or using gamma cameras integrating a sensor in the form of a pixel array based on a CdZnTe or CdTe semiconductor material.

In digital medical imaging using x or γ rays, the image acquisition system delivers an image representative of the quantity of x or γ photons transmitted through the radiographed object placed between the source of x or γ rays and a detector. It is also possible for the object itself to be the source of the γ rays.

An image sensor comprises a matrix of detector pixels and charge reading circuits. Generally, the same charge reading circuit allows reading of the pixels of the same column of detector pixels. The image obtained by an image sensor can contain a certain number of defects due to sensor errors. First, the detector pixel matrix can contain defect pixels. These defect pixels can be isolated or grouped by row and/or by column. It is also possible that the reading circuits and/or the connections between pixels and reading circuits may be defective. In the latter case, the image associated with an entire column of pixels is defective.

Different processing methods are known for correcting image sensor defects. A first treatment is based on image correction by black image. A second process relates to a correction to gain.

The correction by black image consists of subtracting from the image to be corrected an image detected by the sensor in the absence of light, commonly known as a black image. The gain correction is done using the acquisition of an image by uniform lighting of the camera.

Image correction can also be done by combining black image correction and gain correction. The corrected image $I_c$ can then be written:

$$I_c = (I_{NC} - I_N)/(I_G - I_N) \quad (1)$$

wherein $I_{NC}$ is the uncorrected image, $I_N$ is the black image and $I_G$ is the image obtained with uniform lighting of the camera.

Black image correction and gain correction of the image sensor defects are well known to the specialist in the art. Black image correction is necessary in virtue of the presence of dark current and the digital offset voltage. Likewise, gain correction is necessary in virtue of the variation in gain between the different pixels of the same matrix.

According to the state of the art, defect pixels do not provide any intrinsically usable information in respect of the detected image. They are corrected by calculation of a value of the gray level on the basis of adjacent pixels by interpolation, for example.

The correction methods of the known prior art are based on the hypothesis that the response of the detectors to the radiation received is linear. This hypothesis is not always correct. In particular, the applicant has found that this hypothesis is not valid for low gray levels.

The effect of non-linear charge detection for low gray levels is represented in FIG. 1.

FIG. 1 represents two curves of pixel gray levels (G) as a function of the intensity of radiation (R) which illuminates a pixel. A first curve C1 represents the gray level of an idealized pixel and a second curve C2 represents the gray level of a real pixel with loss of charge.

In curve C1, it appears that the illumination level increases linearly as a function of the intensity of the radiation, whatever the level of the radiation intensity.

In curve C2, in contrast, the gray level of the pixel increases linearly as a function of the radiation intensity only beyond a certain threshold $G_0$. In an initial time, the increase of the gray level of the pixel does not increase linearly with the level of illumination due to an increasing loss of electrical charge in proportion to the increase of illumination. In a second time, this loss reaches a maximum level and the level of illumination then becomes linear relative to the illumination level.

The effect of these charge losses causes defects to appear on the image. The charge losses can vary from one row to another and/or from one column to another, the different behaviors then appearing between adjacent rows and/or columns. Furthermore, as was mentioned above, defective columns can also appear on the image in the case where the reading circuit of the pixels of one column and/or the connection between the reading circuit and the pixels of the column are defective.

Correction of these defects is not possible by conventional means. In particular, in the case where the columns are defective, the result can be that a plurality of adjacent columns may be defective. Accordingly, it is impossible to correct one defective column using an adjacent valid column due to the fact of the absence of an adjacent valid column for making a correction by interpolation.

SPECIFICATION OF THE INVENTION

The invention has none of the aforesaid drawbacks.

In fact, the invention relates to a method for determining the reference image of an image sensor comprising a matrix of detector pixels, said method comprising the step of acquisition of a black image $I_N$. The method further comprises:

an acquisition step, wherein a first image $I_1$ is acquired by the action of a first radiation, for which the sensor functions in a linear zone of detection;

an acquisition step, wherein a second image $I_2$ is acquired by the action of a second radiation of an intensity greater than that of the first radiation and for which the sensor functions in a linear zone of detection;

a calculation step, wherein a mean value $R_m$ is calculated, such that:

$$Rm = \frac{1}{N} \sum_{i,j} \frac{I_2(i,j) - I_N(i,j)}{I_1(i,j) - I_N(i,j)} \quad (2)$$

wherein $I_K(i,j)$ represents the value of the pixel of the image $I_K$ detected by the pixel detector situated at the intersection of the row i and the column j of the detector pixel matrix, and N represents the total number of pixels of the matrix;

a calculation step, wherein a first reference image $I_{R1}$ is calculated such that the first reference image is written as:

$$I_{R1} = (R_m \times I_1 - I_2)/(R_m - 1) \quad (3)$$

The invention also relates to an improvement of the aforesaid method. According to the improvement of the invention, the method comprises the following additional steps:

calculation of a black difference image $D_N$ such that:

$$D_N = I_{R1} - I_N \tag{4}$$

summation of the system of pixel values of each column of the black difference image;

division of each sum obtained at the end of the summation step by the number of pixels contained in the column so as to obtain a mean pixel value for each column;

creation of a smoothed image $I_{EP}$ by applying to the different pixels of each column the mean pixel value obtained in the aforegoing step for said column;

calculation of a second reference image $I_{R2}$ such that:

$$I_{R2} = I_N - I_{EP} \tag{5}$$

The invention also relates to a method for correcting the image defects in images obtained using an image sensor, characterized in that it implements a method for determining the reference image of the image sensor according to the invention.

BRIEF DESCRIPTION OF THE DRAWINGS

Other features and advantages of the invention will become apparent when reading the description of a preferred embodiment with reference to the appended figures, wherein.

On all the figures, the same reference numerals denote the same components.

DETAILED DESCRIPTION OF THE EMBODIMENTS OF THE INVENTION

Figure 1:
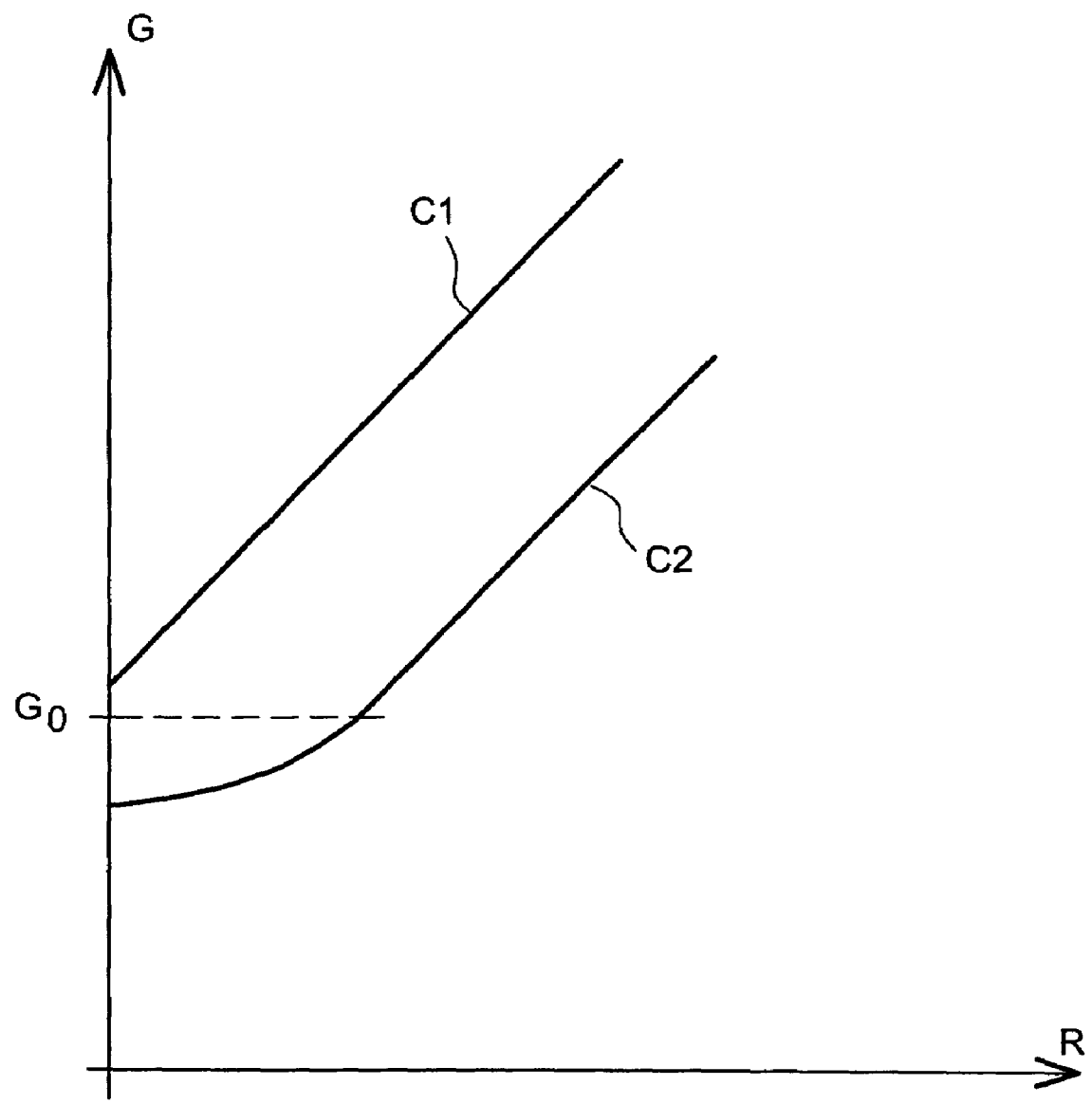
FIG. 1 represents the pixel gray level curves as a function of the radiation intensity illuminating the pixel.

FIG. 1 was described previously and repetition would serve no useful purpose.

Figure 2:
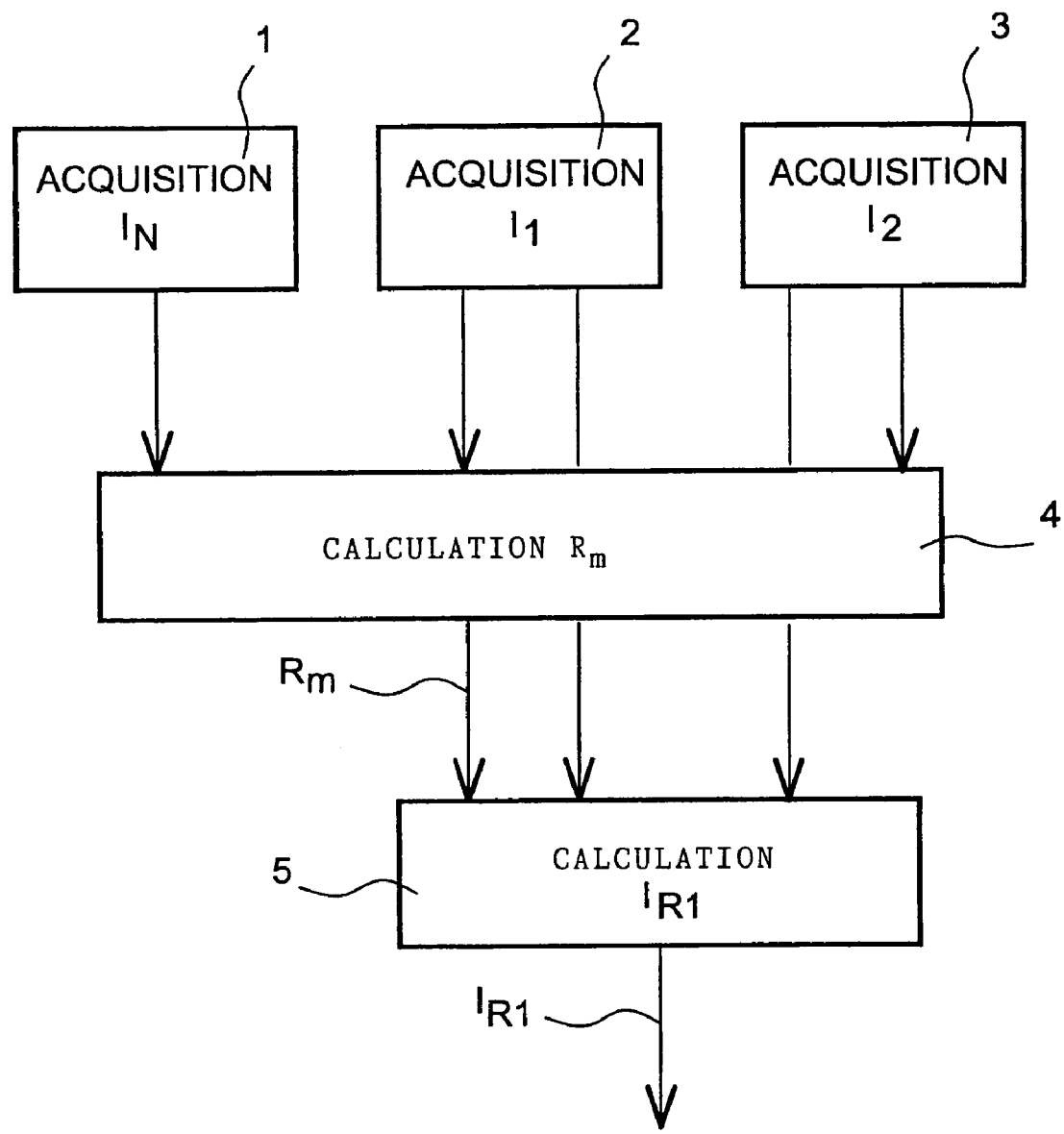
FIG. 2 represents a flow chart of the method for determining the reference image according to the invention.

FIG. 2 represents a flow chart of the method for determining a reference image according to the invention.

The method comprises firstly three steps for acquiring images using an image sensor. A first step 1 is the image acquisition step for acquiring a black image $I_N$. A second step 2 is an acquisition step for acquiring a first image $I_1$ by the operation of a first radiation and a third step 3 is an acquisition step for acquiring a second image $I_2$ by the operation of a second radiation. The illumination conditions of the sensor for acquiring the images $I_1$ and $I_2$ are done in the linear zone of operation of the sensor. Image 12 is obtained for an incident radiation that is greater than the radiation intensity that is used for obtaining the image $I_1$.

The radiation intensities for acquiring the images $I_1$ and $I_2$ can be chosen in different ways. For example, it is possible to choose, for acquiring image $I_2$, an incident radiation that generates a gray level approximating the maximum level that it is possible to reach before saturation of the sensor and, for acquiring the image $I_1$, an incident radiation of half the intensity of the radiation that enables acquiring the image $I_2$. This selection method is possible only if the image sensor has a linear behavior in the half-height of the gray levels, which is usually the case.

Another way for acquiring the images $I_1$ and $I_2$ will now be described.

Firstly, two initial images are acquired $I_{10}$ and $I_{20}$ at two different radiation intensities, the radiation intensity for acquiring the image $I_{20}$ being greater than the radiation intensity for acquiring the image $I_{10}$. Then a projection of these two images is done in the direction of the columns. The projections obtained each form a continuous profile that can include peaks representative of the defect pixel columns. If the peaks are identical from one profile to another, it is deduced that the two initial images $I_{10}$ and $I_{20}$ have been taken in a zone of linear behavior of the sensor. The image $I_{10}$ is then chosen as the first image $I_1$ and the image $I_{20}$ as the second image $I_2$.

If the peaks are not identical from one profile to the other, it is deduced that it is not in a zone of linear behavior of the sensor. The linear behavior zone of the sensor being situated towards the increasing intensities (cf. FIG. 1), a new initial image is thus obtained for replacing the initial image $I_{10}$ previously acquired with the lowest intensity and the projection step is repeated. If the new initial image $I_{10}$ and the initial image $I_{20}$ previously acquired have identical continuous profiles, they are then chosen respectively as the first image $I_1$ and second image $I_2$. If not, new image acquisitions are carried out until obtaining identical profiles enabling selection of the first and second images.

Each image $I_1$, $I_2$ can be a single image obtained consequent to a single illumination of the sensor or an averaged image obtained consequent to a plurality of successive illuminations of the sensor under substantially identical conditions.

Steps 1, 2 and 3 are followed by a calculation step 4 for calculating a mean ratio $R_m$ defined by the equation below:

$$Rm = \frac{1}{N} \sum_{i,j} \frac{I_2(i,j) - I_N(i,j)}{I_1(i,j) - I_N(i,j)}, \tag{6}$$

wherein $I_k(i,j)$ represents the value of the pixel of the image $I_K$ detected by the pixel detector situated at the intersection of row i and column j of the detector pixel matrix, and N represents the total number of pixels of the matrix.

A first reference image $I_{R1}$ can then be calculated using a step 5 that follows step 4. Where:

$$I_{R1} = (R_m \times I_1 - I_2)/(R_m - 1) \tag{7}$$

The quantity $I_{R1}$ can then be used as the reference image in an image defect correction procedure according to the invention, for example, by replacing the quantity $I_N$ in the equation (2). Advantageously, the reference image $I_{R1}$ enables correcting the aforesaid non-linear effects.

Figure 3:
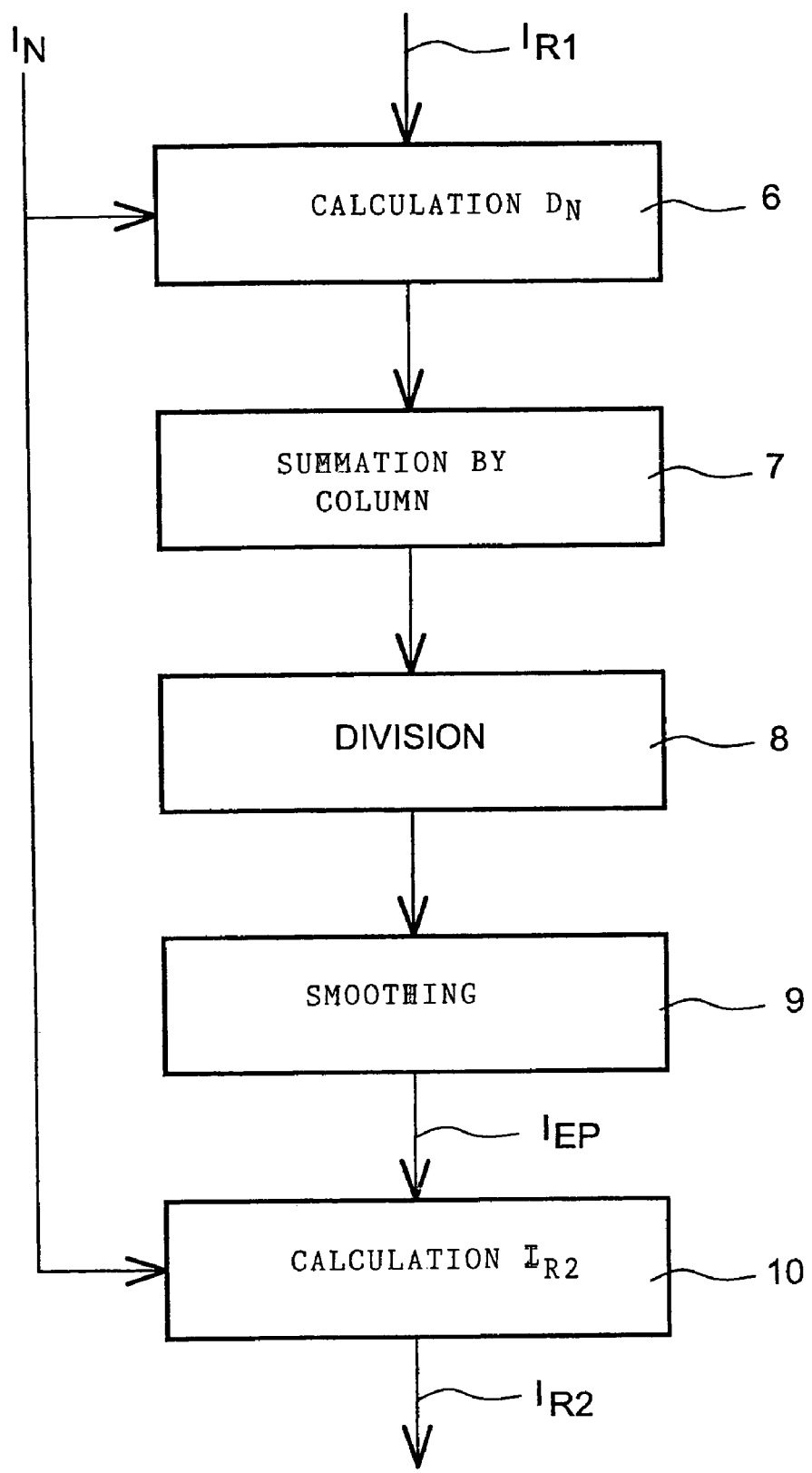
FIG. 3 represents a flow chart of an improvement of the method for determining the reference image according to the invention.

FIG. 3 represents an improvement of the method for determining the reference image according to the invention.

According to the improvement of the method of the invention, the image $I_{R1}$ is not directly used as reference image but serves to define another reference image $I_{R2}$ different from the image $I_{R1}$. As will become apparent in the course of the description, the reference image $I_{R2}$ is particularly well adapted for correcting defect pixels that are present in the form of columns of defect pixels. A plurality of steps then follow the aforementioned step 5.

Step 6, which immediately follows step 5 is a black difference image $D_N$ calculation step between the image $I_{R1}$ and the black image $I_N$. Where:

$$D_N = I_{R1} - I_N \tag{8}$$

A step 7 follows step 6 and is a summation of all of the pixel values of each column of the black difference image $D_N$, then a step 8 of division of each sum so obtained by the number of pixels of each column so as to obtain a mean pixel value $M_j$ for each column j of the black difference image. A step 9 of smoothing follows step 8. Step 9 enables creating a smoothed image $I_{EP}$ obtained by applying to the different pixels of a column j the average value $M_j$ of the column calculated previously. The reference image $I_{R2}$ using the improvement of the invention is then obtained by subtraction of the smoothed image $I_{EP}$ from the black image $I_N$. Where:

$$I_{R2}=I_N-I_{EP} \quad (9).$$

In addition to the correction of the aforementioned non-linear effects, the reference image $I_{R2}$ thus advantageously enables taking into account the detection defects that may appear in the entire columns.

What is claimed is:

1. A method for correcting image defects of an image sensor, said image sensor comprising a matrix of pixel detectors, the method comprising an acquisition step for acquiring a black image $I_N$, wherein the method comprises:
    an acquisition step for acquiring a first image $I_1$ by the operation of a first radiation for which the sensor functions in a linear detection zone;
    an acquisition step for acquiring a second image $I_2$ by the operation of a second radiation of an intensity greater than that of the first radiation and for which the sensor functions in a linear detection zone;
    a calculation step for calculating a mean value $R_m$, such that:

$$Rm = \frac{1}{N}\sum_{i,j}\frac{I_2(i,j)-I_N(i,j)}{I_1(i,j)-I_N(i,j)},$$

wherein $I_k$ (i,j) represents the value of the pixel of the image $I_k$ detected by the pixel detector situated at the intersection of the row i and the column j of the detector pixel matrix, and N represents the total number of pixels of the matrix;
    a calculation step, wherein a first reference image $I_{R1}$ is calculated such that the first reference image is written as:

$$I_{R1}=(R_m \times I_1-I_2)/(R_m-1); \text{ and}$$

a use of the first reference image $I_{R1}$ as the black image $I_N$ so that the defects of the image sensor are corrected with the first reference image $I_{R1}$.

2. The method according to claim 1, wherein the intensity of the second radiation is substantially double the intensity of the first radiation.

3. The method according to claim 2, wherein the intensity of the second radiation has a value substantially equal to an intensity of radiation that generates a gray level approximating the maximum level that is possible to reach before saturation of the sensor.

4. The method according to claim 1, wherein the first image $I_1$ and the second image $I_2$ are chosen in the following way:
    two initial images are acquired $I_{10}$ and $I_{20}$ at two different radiation intensities, a radiation intensity for acquiring the image $I_{20}$ being greater than a radiation intensity for acquiring the image $I_{10}$;
    a projection of the two initial images $I_{10}$ and $I_{20}$ is done in the direction of the columns; the projections obtained each from a continuous profile that include peaks representative of the detector defect pixels;
    a comparison of the continuous profiles, and
    when the peaks are identical from one profile to another, the image $I_{10}$ is then chosen as the first image $I_1$ and the image $I_{20}$ as the second image $I_2$, or
    when the peaks are not identical from one profile to the other, acquisition of at least one new initial image for replacing at least the initial image $I_{10}$ and a new projection step; acquisition of at least one new initial image and the new projection step being carried out until obtaining identical continuous profiles enabling selection of said first and second images.

5. A method for correcting image defects of an image sensor, said image sensor comprising a matrix of pixel detectors, the method comprising an acquisition step for acquiring a black image $I_N$, wherein the method comprises:
    an acquisition step for acquiring a first image $I_1$ by the operation of a first radiation for which the sensor functions in a linear detection zone;
    an acquisition step for acquiring a second image $I_2$ by the operation of a second radiation of an intensity greater than that of the first radiation and for which the sensor functions in a linear detection zone;
    a calculation step for calculating a mean value $R_m$, such that:

$$Rm = \frac{1}{N}\sum_{i,j}\frac{I_2(i,j)-I_N(i,j)}{I_1(i,j)-I_N(i,j)},$$

wherein $I_k$ (i,j) represents the value of the pixel of the image $I_k$ detected by the pixel detector situated at the intersection of the row i and the column j of the detector pixel matrix, and N represents the total number of pixels of the matrix;
    a calculation step, wherein a first reference image $I_{R1}$ is calculated such that the first reference image is written as:

$$I_{R1}=(R_m \times I_1-I_2)/(R_m-1);$$

a calculation of a black difference image $D_N$ such that:

$$D_N=I_{R1}-I_N;$$

a summation of the set of pixel values of each column of the black difference image;
    a division of each sum obtained at the end of the summation step by the number of pixels contained in the column so as to obtain a mean pixel value for each column;
    a creation of a smoothed image $I_{EP}$ by applying to the different pixels of each column the mean pixel value obtained in the aforegoing step for said column;
    a calculation of a second reference image $I_{R2}$ such that:

$$I_{R2}=I_N-I_{EP}; \text{ and}$$

a use of the second reference image $I_{R2}$ to correct the defects of the image sensor.

6. The method according to claim 5, wherein the intensity of the second radiation is substantially double the intensity of the first radiation.

7. The method according to claim 6, wherein the intensity of the second radiation has a value substantially equal to an intensity of radiation that generates a gray level approximating the maximum level that is possible to reach before saturation of the sensor.

8. The method according to claim 5, wherein the first image $I_1$ and the second image $I_2$ are chosen in the following way:
- two initial images are acquired $I_{10}$ and $I_{20}$ at two different radiation intensities, a radiation intensity for acquiring the image $I_{20}$ being greater than a radiation intensity for acquiring the image $I_{10}$;
- a projection of the two initial images $I_{10}$ and $I_{20}$ is done in the direction of the columns; the projections obtained each from a continuous profile that include peaks representative of the detector defect pixels;
- a comparison of the continuous profiles, and
- when the peaks are identical from one profile to another, the image $I_{10}$ is then chosen as the first image $I_1$ and the image $I_{20}$ as the second image $I_2$, or
- when the peaks are not identical from one profile to the other, acquisition of at least one new initial image for replacing at least the initial image $I_{10}$ and a new projection step; acquisition of at least one new initial image and the new projection step being carried out until obtaining identical continuous profiles enabling selection of said first and second images.

* * * * *